Aug. 31, 1965    G. H. FUEHRER    3,203,489
SINKER DRILL

Original Filed March 24, 1960    8 Sheets-Sheet 1

INVENTOR.
GEORGE H. FUEHRER
BY
ATTORNEY

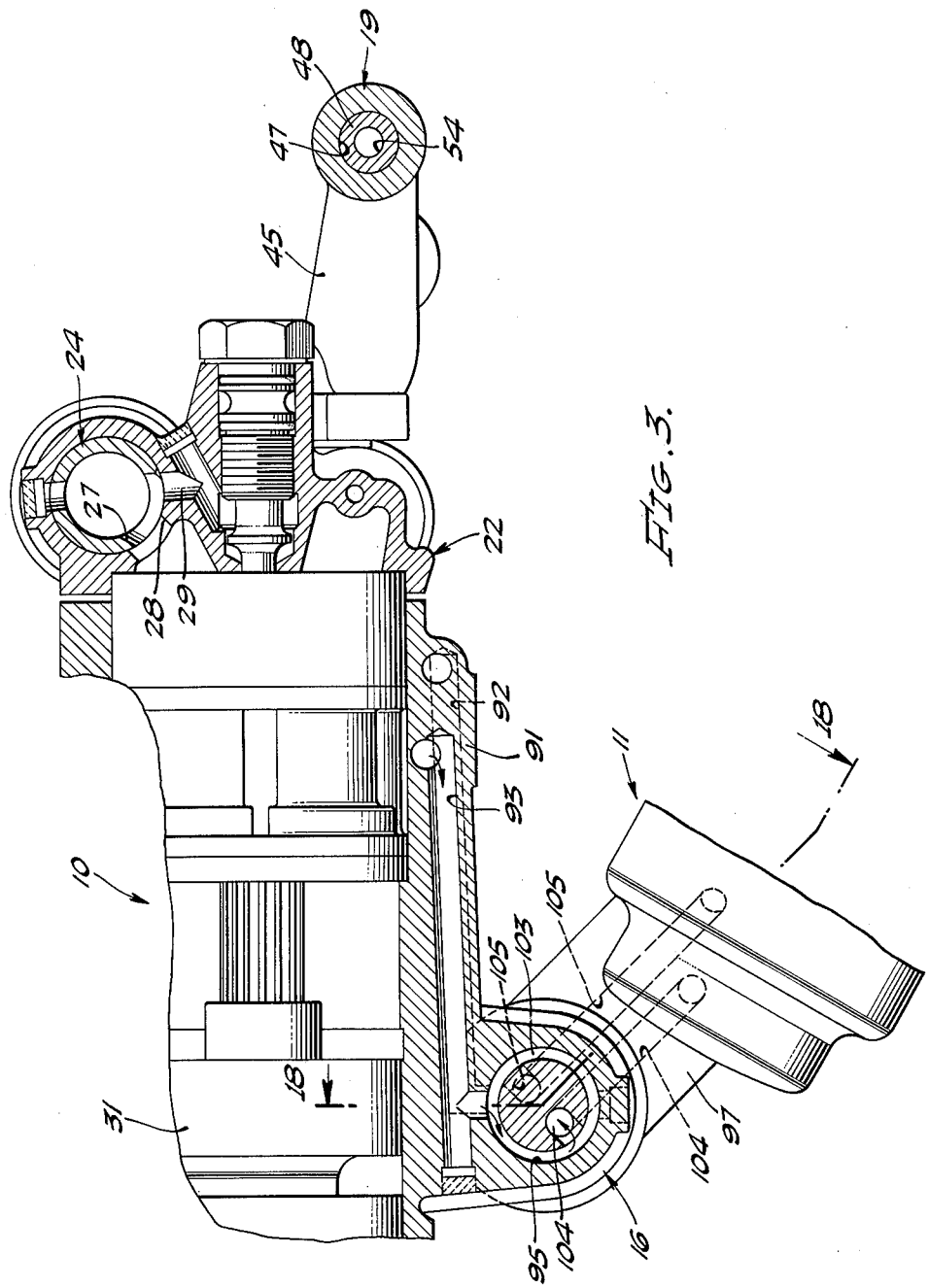

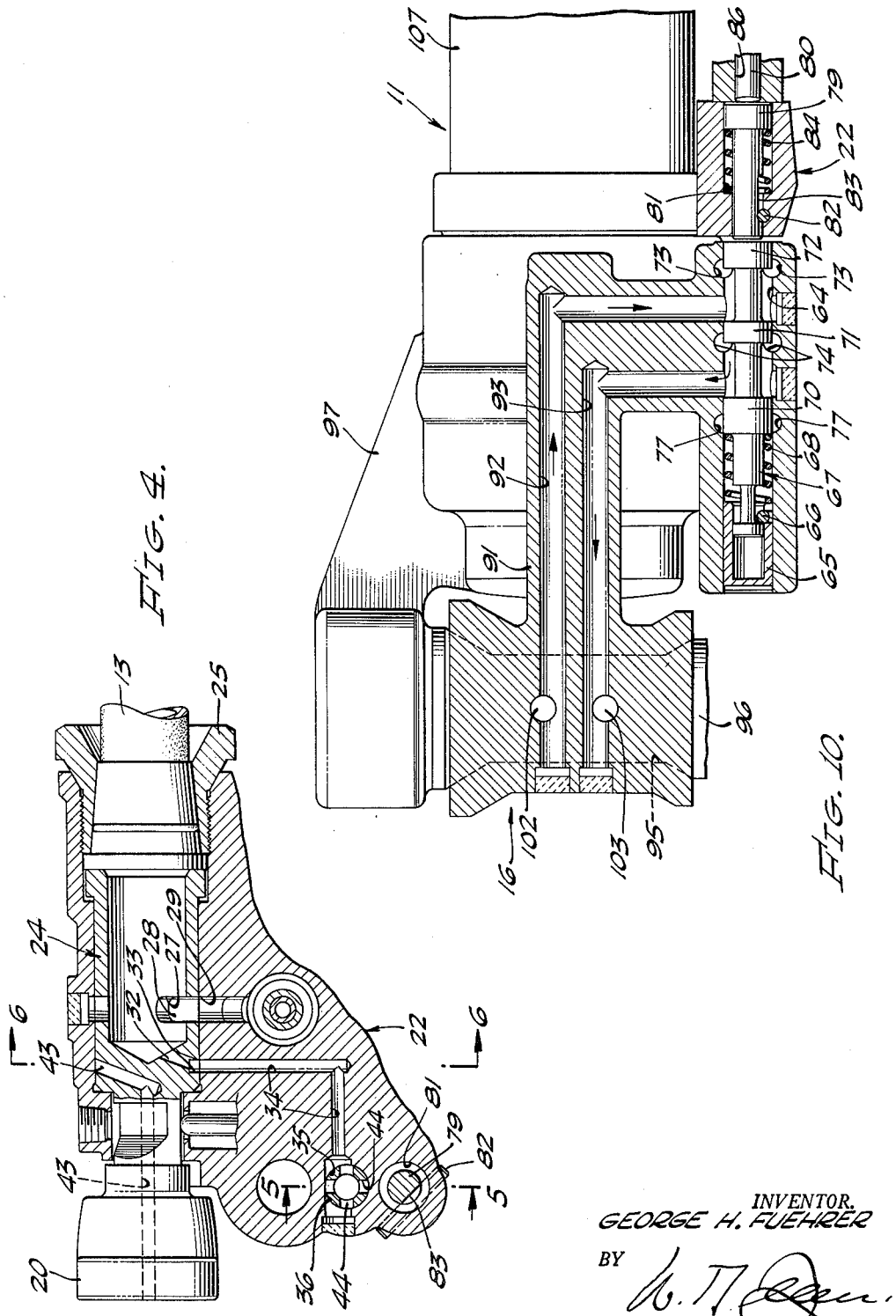

Aug. 31, 1965      G. H. FUEHRER      3,203,489
SINKER DRILL
Original Filed March 24, 1960      8 Sheets-Sheet 4
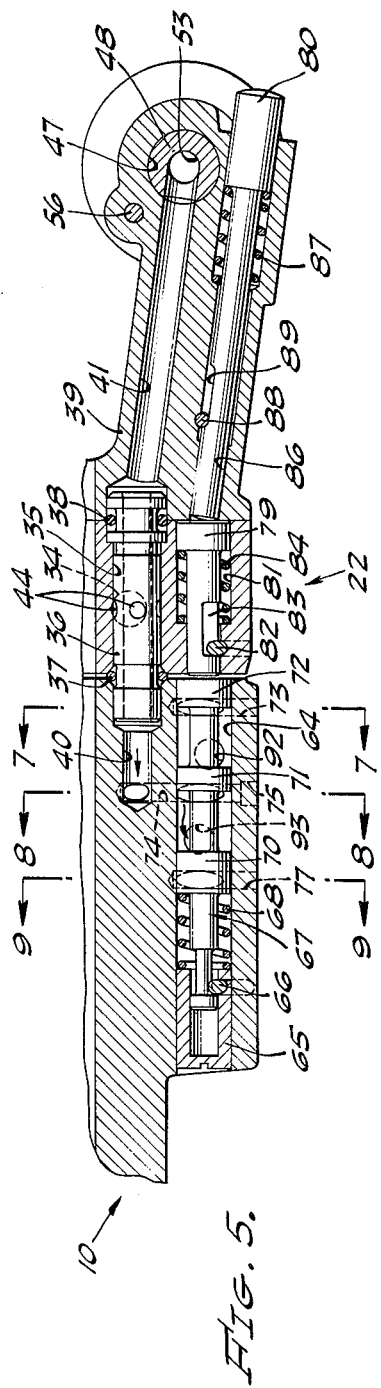
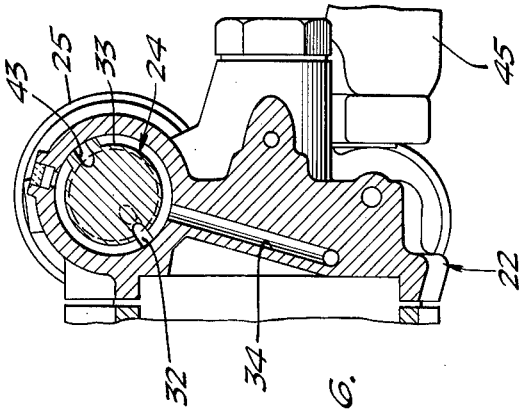
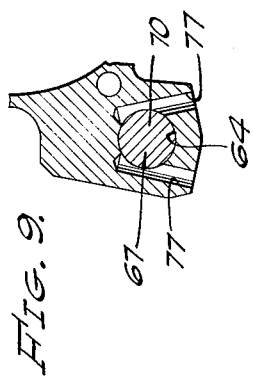
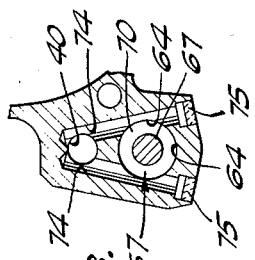
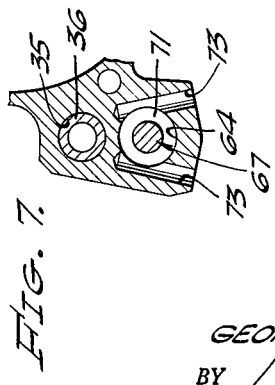
INVENTOR.
GEORGE H. FUEHRER
BY
ATTORNEY Aug. 31, 1965     G. H. FUEHRER     3,203,489
SINKER DRILL
Original Filed March 24, 1960     8 Sheets-Sheet 5
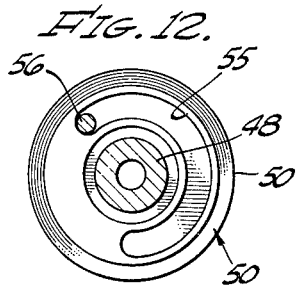
FIG. 12.
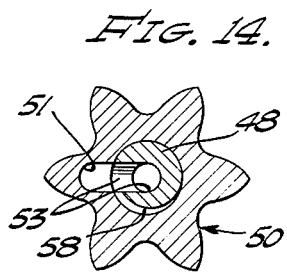
FIG. 14.
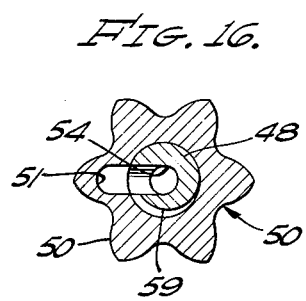
FIG. 16.
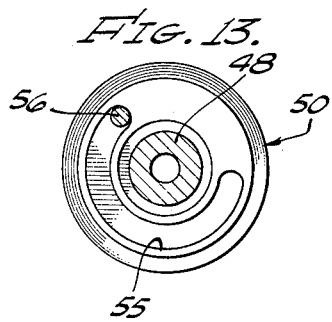
FIG. 13.
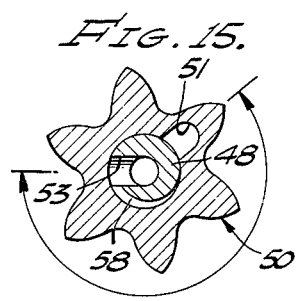
FIG. 15.
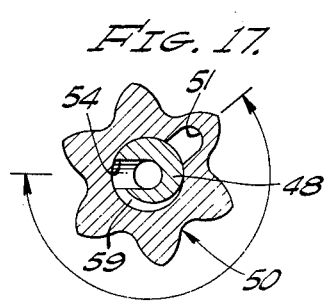
FIG. 17.
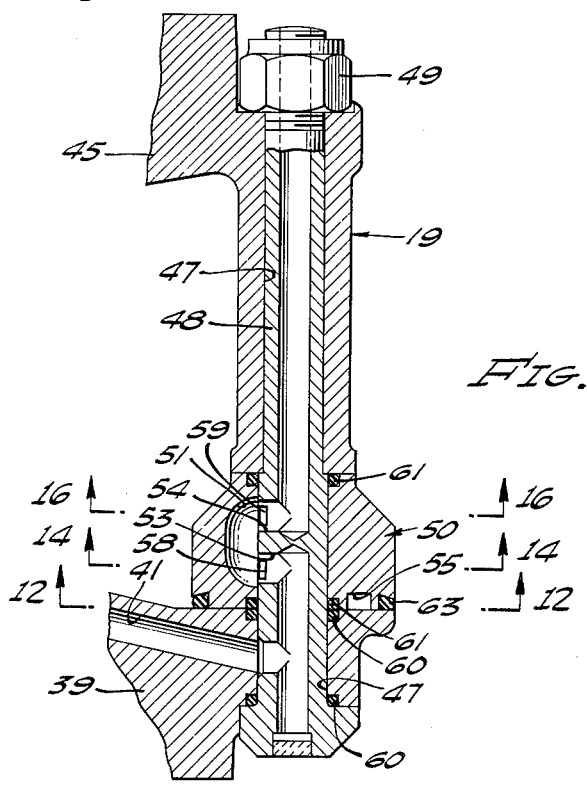
FIG. 11.
INVENTOR.
GEORGE H. FUEHRER
BY 
ATTORNEY

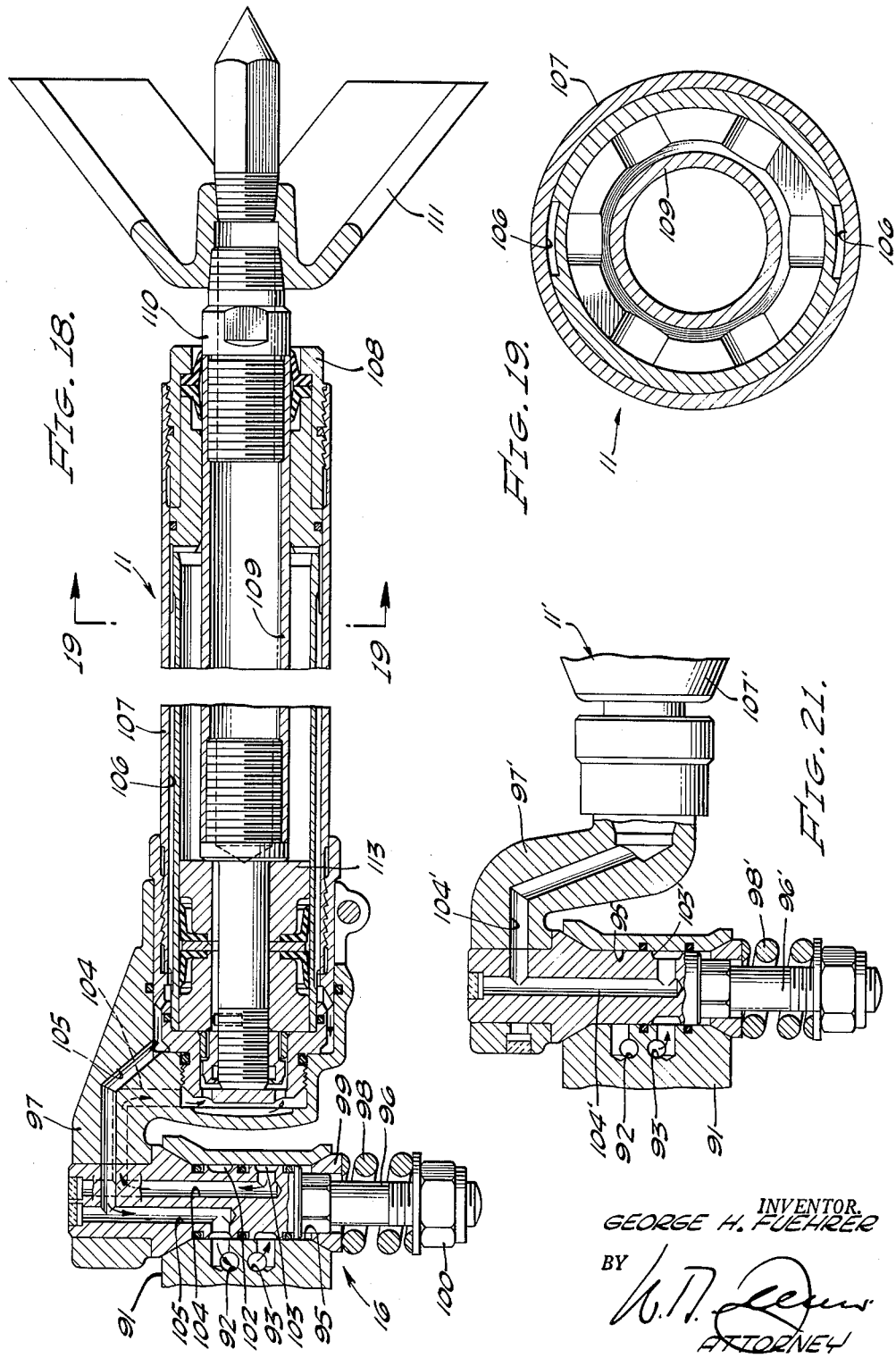

Aug. 31, 1965   G. H. FUEHRER   3,203,489
SINKER DRILL
Original Filed March 24, 1960   8 Sheets-Sheet 8
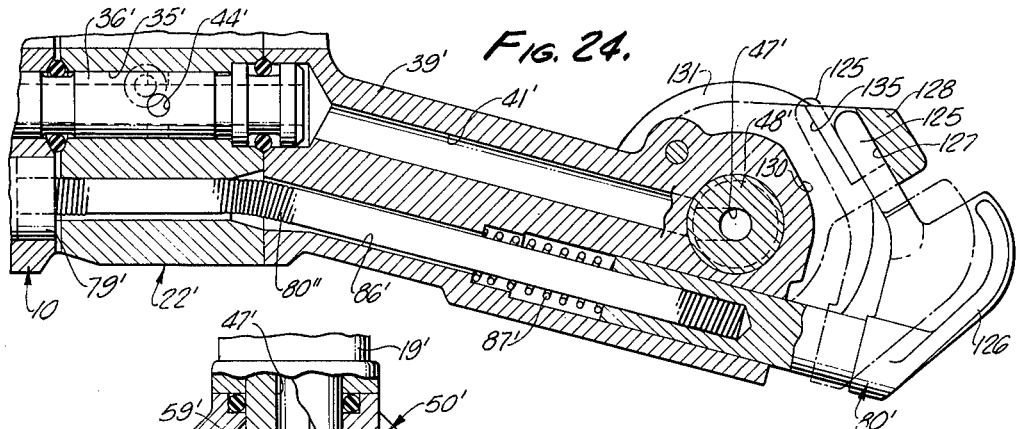
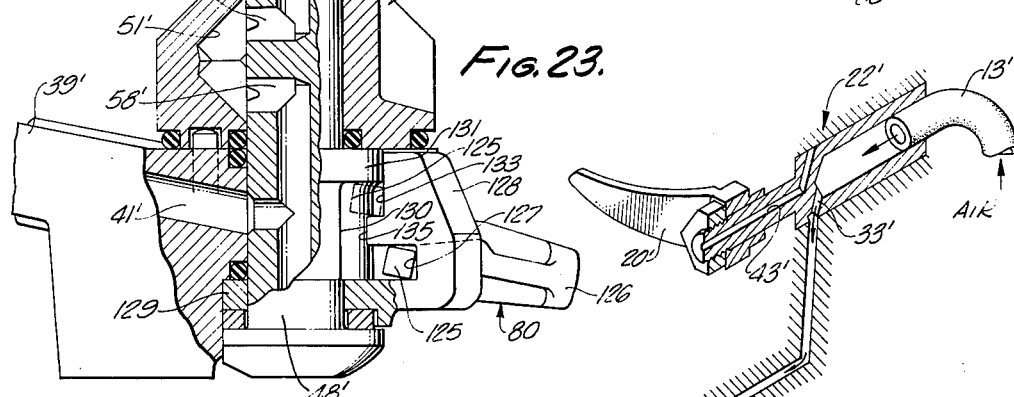
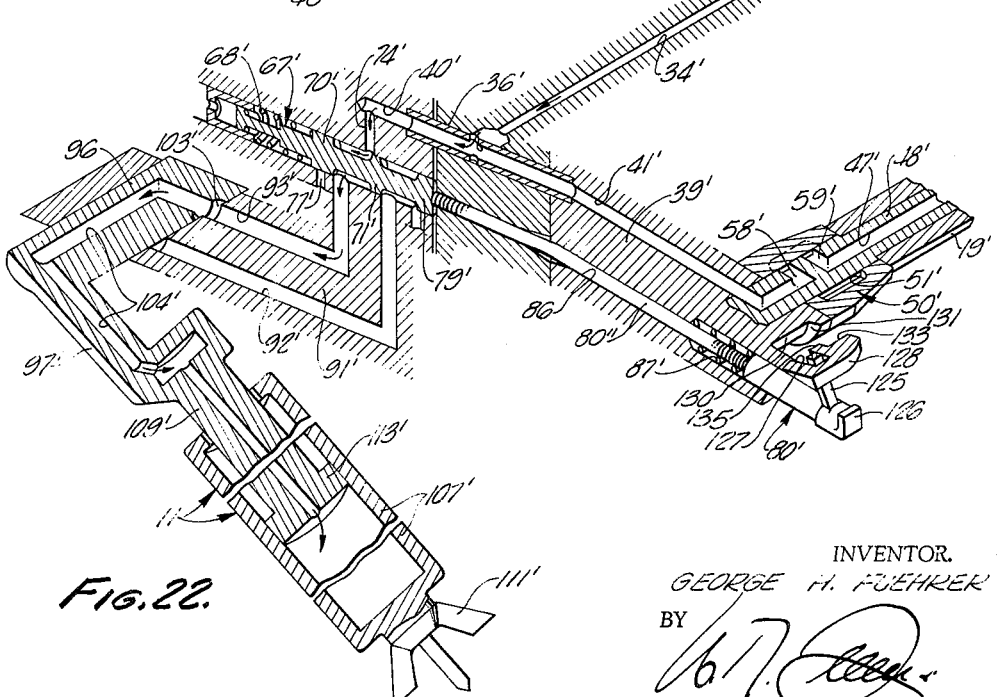
INVENTOR.
GEORGE H. FUEHRER
BY
ATTORNEY United States Patent Office 3,203,489
Patented Aug. 31, 1965

1

3,203,489
SINKER DRILL
George H. Fuehrer, Downey, Calif., assignor to Thor
Power Tool Company, Aurora, Ill., a corporation of
Delaware
Continuation of application Ser. No. 17,288, Mar. 24,
1960. This application July 18, 1963, Ser. No. 296,889
15 Claims. (Cl. 173—36)

This invention relates to pneumatically actuated power drills and more particularly to a sinker drill of the type commonly supported and advanced into the material being drilled by a feed leg assembly, and featuring simplified means intimately associated with the drill handgrip and operable to control the operation of a feed leg of either the retractable or non-retractable type.

This is a continuation of my application for U.S. Letters Patent Serial Number 17,288 filed March 24, 1960 for a Sinker Drill, now abandoned.

Sinker drills of the type dealt with by the present invention are used in large numbers in mining operations, drilling sinker holes for explosives and the like. It is customary to support such drills in a generally horizontal position pivotally at the upper end of an extendible feed leg assembly and to utilize a portion of the pressurized air to operate the feed leg. Customarily there is need for a continuing supply of air to the feed leg not only to compensate for leakage but also to extend the feed leg. Desirably the supply of this air to the feed leg must be regulatable with considerable precision and preferably without interference with the use of the operator's hands to manipulate the drill and perform other operations.

Previous sinker drill constructions though endeavoring to meet these various requirements leave much to be desired. This has been due in part to the inconvenient location of the control valves and in part to inefficient and ineffective valve design and the lack of suitable safety locks. While these constructions have been tolerable for normal operations they have been highly unsatisfactory for difficult operating conditions and this is particularly true as respects emergency situations requiring fast action on the part of both the operator and the equipment to avoid serious injury to the operator and the equipment. Furthermore, there has been inadequate means for quickly releasing the pressurized air from the feed leg or for forcibly retracting it when this becomes desirable because of some suddenly occurring hazard, the breakage of the drill bit or jamming of the drill mechanism itself. Nor has there been provision in prior designs for locking the controls in a desired position for the protection of the operator and the equipment itself.

Additionally prior drill constructions have been usable only with either a retractable or a non-retractable feed leg and not interchangeably with either. It is most desirable that the same drill be usable selectively with either type of feed leg to provide a greater flexibility in the use of the equipment to meet differing operating needs and in the interest of cost savings at the place of manufacture as well as in the hands of the user.

In view of the foregoing, and other disadvantages and shortcomings of prior sinker drill constructions it is the purpose of the present invention to provide an improved sinker drill having simplified and novel control means readily and conveniently accessible immediately adjacent the guiding handgrip for the drill and so designed and arranged as to control the operation of the feed leg by the thumb and index finger of the hand grasping the handgrip without need for relaxing the grasp of the handgrip. More particularly, the present invention includes means for controlling the extension of the feed leg by varying the proportion of the pressurized actuating air therefor allowed to escape to the atmosphere under the control of an easily-manipulated fine adjustment supported on the handgrip. Associated with this fine finger control is a second valve actuator instantly adjustable to one of several different positions and effective to selectively increase or discontinue the supply of pressurized air to the feed leg under normal drilling operations and, in emergencies, to dump to the atmosphere pressurized air present in the feed leg. The latter includes simple but effective safety means for rendering the feed leg ineffective safety means for rendering the feed leg ineffective for power extension and for locking the controls in position to dump pressurized air from the feed leg.

As was mentioned above, this air control is usable with either a retractable or a non-retractable type feed leg. If a retractable feed leg is used the dumping valve mechanism is manipulatable to supply pressurized air selectively to either end of the feed leg and otherwise provides advantages not otherwise available. If a non-retractable feed leg is used, as is possible without change in the drill or the control valves, the dumping valve mechanism is operable selectively to trap pressurized air in the feed leg chamber or to dump this air abruptly to the atmosphere.

Accordingly, it is a primary object of the present invention to provide a new and improved sinker drill featuring a simplified, more effective and more efficient means for controlling the operation of the supporting feed leg assembly with greater safety to both the equipment and the operator.

Another object of the invention is the provision of a pneumatically actuated sinker drill having improved means for controlling the operation of the feed leg assembly and usable interchangeably with either a non-retractable or a retractable feed leg without need for any change in the drill equipment.

Another object of the invention is the provision of a sinker drill selectively useable with both power retracted and non-power retracted feed leg assemblies without need for changes of any nature in the control valve mechanism and further characterized in that the entire control valve mechanism is mounted on the sinker drill proper in convenient position for manipulation by one hand while in gripping engagement with the customary sinker drill hand grip.

Another object of the invention is the provision of a sinker drill construction having a principal guide handle combined with an operating control for the feed leg which control is manipulatable by the same hand normally resting on the handgrip of the guide handle.

Another object of the invention is the provision of an improved sinker drill having a guide handle rigidly fixed to the backhead assembly and intimately associated with a pair of valves controlling the operation of the feed leg, one valve serving to regulate the extension of the feed leg and the other being instantly unsable selectively to cut off all supply to the feed leg and additionally to dump trapped air to the atmosphere together with simple means for locking the parts in position to dump air from the feed leg.

Another object of the invention is the provision of a sinker drill having a handgrip rigidly fixed to its backhead and provided with fine regulating valve rotatable about the handgrip axis to operate the feed leg assembly and including in addition a fast action plunger valve mechanism closely adjacent thereto and manipulatable to dump pressurized air from the feed leg to effect the retraction thereof and also including means for assuring continued dumping without aid from the operator.

Another object of the invention is the provision of an improved handgrip and feed leg control mechanism for a pneumatic drill.

These and other more specific objects will appear upon reading the following specification and claims and upon considering in connection therewith the attached drawings to which they relate.

Referring now to the drawings in which a preferred embodiment of the invention is illustrated:

FIGURE 3 is a fragmentary enlarged sectional view taken along line 3—3 on FIGURE 2;

FIGURE 4 is a transverse sectional view on an enlarged scale taken through the hammer or main control valve and generally along line 4—4 on FIGURE 2;

FIGURE 5 is a fragmentary view on an enlarged scale taken along line 5—5 on FIGURE 4 and shows the normal position of the spool valve controlling dumping of the air as well as the flow of pressurized air to the feed leg together with actuator therefor;

FIGURE 6 is a cross-sectional view through the hammer or main control valve taken along line 6—6 on FIGURE 4;

FIGURES 7, 8 and 9 are fragmentary transverse sectional views taken, respectively, along lines 7—7, 8—8, 9—9 on FIGURE 5;

FIGURE 10 is a fragmentary longitudinal sectional view taken through the spool valve assembly in the plane of the passages traversing these valves and leading to the elbow joint interconnecting the feed leg with the drill body proper;

FIGURE 11 is a longitudinal transverse sectional view through a supporting leg of the handgrip for the drill taken along line 11—11 on FIGURE 1;

FIGURES 12 and 13 are taken along line 12—12 on FIGURE 11 and respectively show the two extreme positions of the control valve for the feed leg;

Figure 1:
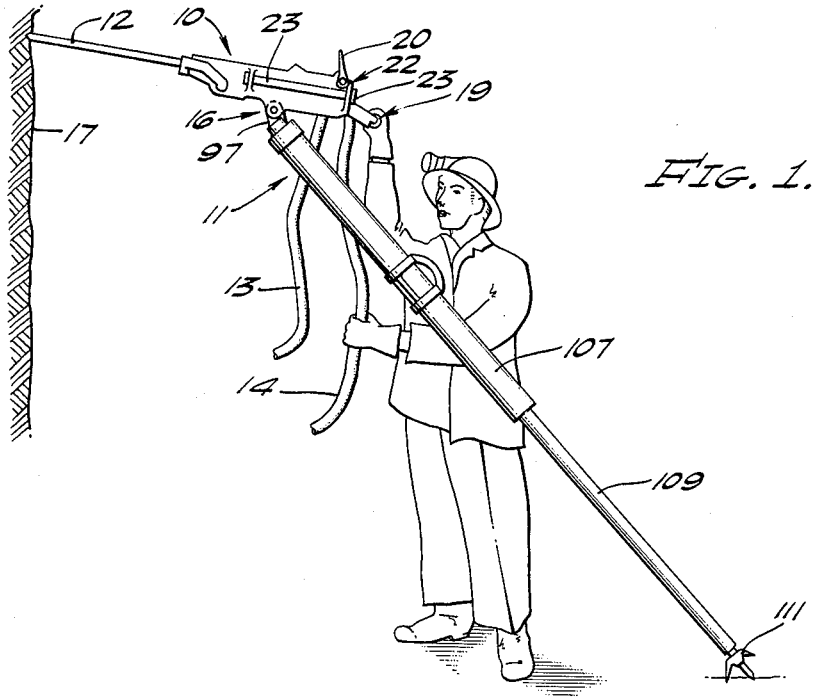
FIGURE 1 is a general view of a sinker drill in use in a typical drilling operation.
Figure 20:
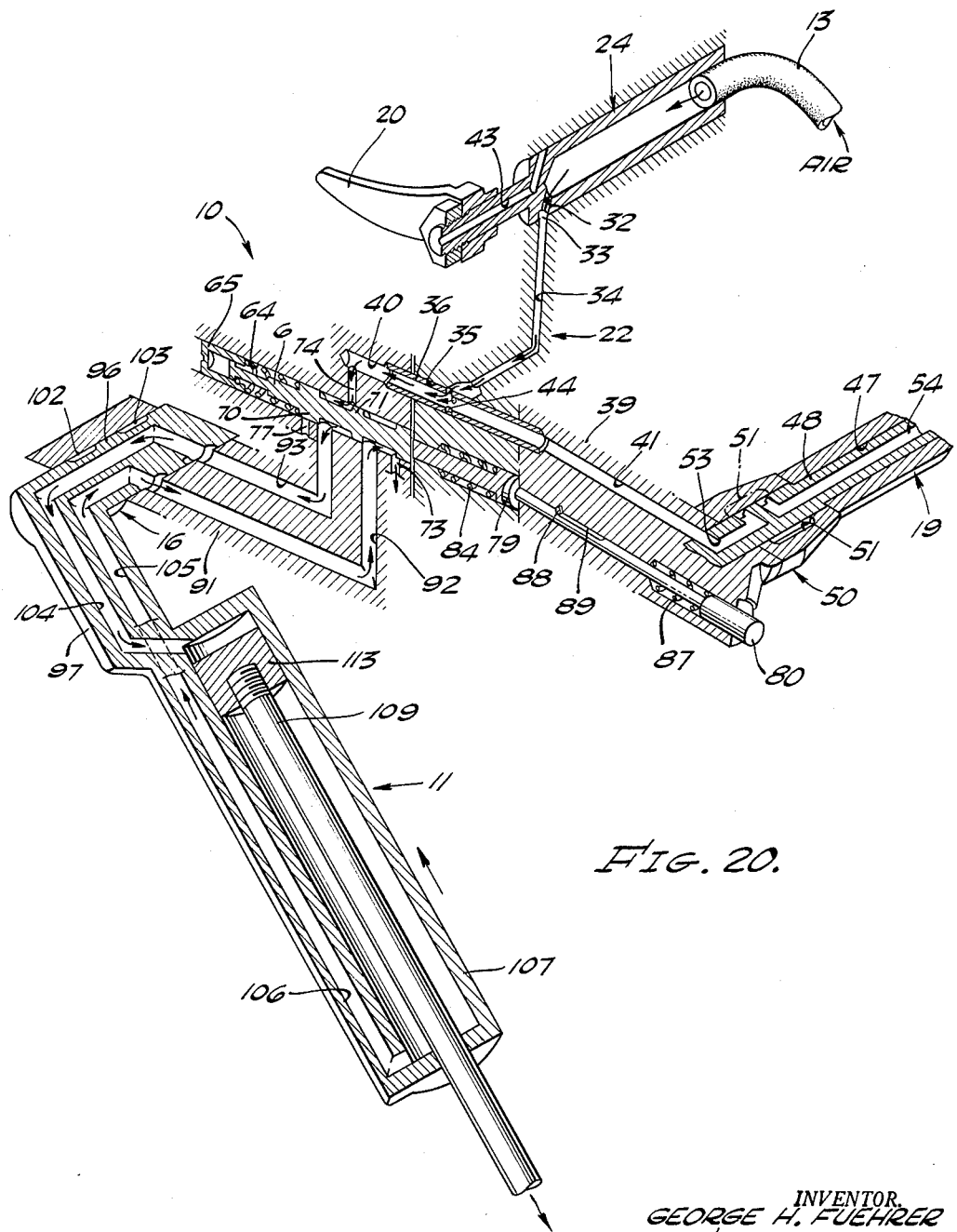

FIGURES 14 and 15 are transverse sectional views similar to FIGURES 12 and 13 but taken along line 14—14 on FIGURE 11;

FIGURES 16 and 17 are views similar to views 12 to 15 but taken along line 16—16 on FIGURES 11;

FIGURE 18 is a longitudinal sectional view through the feed leg and the pivotal or elbow connection thereof with the drill proper;

FIGURE 19 is a transverse sectional view on an enlarged scale taken along line 19—19 on FIGURE 18;

FIGURE 20 is a general schematic view showing a retractable feed leg with the several air control valves positioned to supply pressurized air to the leg;

FIGURE 21 is a fragmentary view of a second embodiment and showing the upper end only of a non-retractable feed leg coupled to the drill in lieu of retractable feed leg illustrated in FIGURE 1;

FIGURE 22 is a general schematic view similar to FIGURE 20 but showing a non-power retractable feed leg assembly in use to support the power tool and also showing a modified form of the air dumping valve including a locking device therefor;

FIGURE 23 is a fragmentary view on an enlarged scale and partially in section showing details of the modified air dumping valve and its operative relationship to the air flow and pressure regulating valve for the feed leg; and FIGURE 24 is a longitudinal sectional view taken similarly to FIGURE 5 and showing details of the modified dumping valve and locking device therefor.

Referring to FIGURE 1 there is shown a typical pneumatically operated sinker drill designated generally 10 and incorporating the present invention, the drill proper being shown as supported on a retractable feed leg designated generally 11. Secured in the forward end of the drill proper is a drill steel 12.

Pressurized air to operate the drill and feed leg 11 is supplied through hose 13, a second hose 14 being connected to the backhead of the drill in known manner to supply flushing fluid, as water, to the inner end of the bore through a passage extending axially of drill steel 12. Feed leg assembly 11 is pivotally connected through an elbow joint or socket 16 with the main body of drill 10, the feed leg operating in a manner to be explained presently to support the weight of the drill and to advance it into formation 17 under power furnished by pressurized air to the feed leg and controlled as will be explained in detail below by the right hand of the operator while grasping handgrip 19 rigid with the backhead of the drill. Handle 20 is secured to the master valve controlling the flow of air to all parts of the sinker drill including the main chamber and the feed leg assembly.

Referring to the FIGURES 2 to 6, it is pointed out that backhead 22 is detachably secured to the rear end of the main body of the drill by bolts 23 (FIGURE 1).

A transverse bore formed in backhead 22 rotatably seats a valve plug 24 operable by handle 20 to control the flow of pressurized air supplied by hose 13 to all parts of the drill assembly. Hose 13 is held secured to the backhead as by a threaded bushing 25 and discharges directly into the open end of master valve plug 24 as is made clear by FIGURE 4. A main port 27 of plug 24 is movable to a position of registry with a passage 28 (FIGURE 3) as well as with a second passage 29 opening axially into the drill body to reciprocate hammer 31 (FIGURE 3) to drive drill steel 12 percussively and advance its bit end into the formation. Master valve plug 24 includes a port 32 opening into an arcuate groove 33 formed about its exterior and positioned to communicate with a passage 34 formed in the backhead opening through the side wall of a cylindrical bore 35 snugly seating an open ended tube 36.

Tube 36 is sealed to bore 35 by O-rings 37 and 38 surrounding grooved portions of this tube adjacent its opposite ends. As is best shown in FIGURE 5 O-ring 37 additionally provides a gasket between the backhead and the main body of the drill whereas O-ring 38 additionally serves as a gasket between tube 36, bore 35 and one supporting leg 39 of handgrip 19. The interior of tube 36 opens at its forward end into a passage 40 whereas its rear end opens into passage 41 extending lengthwise of handgrip leg 39.

Valve plug 24 includes a generally L-shaped passage 43 (FIGURE 4) opening at one end axially to the atmosphere through the shank supporting valve operating handle 20. The other shorter leg of passage 43 is positioned to register with the inner end of passage 34 only in the closed position of the main valve and provides additional means for venting pressurized air in the feed leg to the atmosphere more quickly than would otherwise be possible. Additionally, it is pointed out that the outer end of passage 34 communicates with the interior of tube 36 through a plurality of radial openings 44 (FIGURES 4, 5 and 20).

Figure 2:
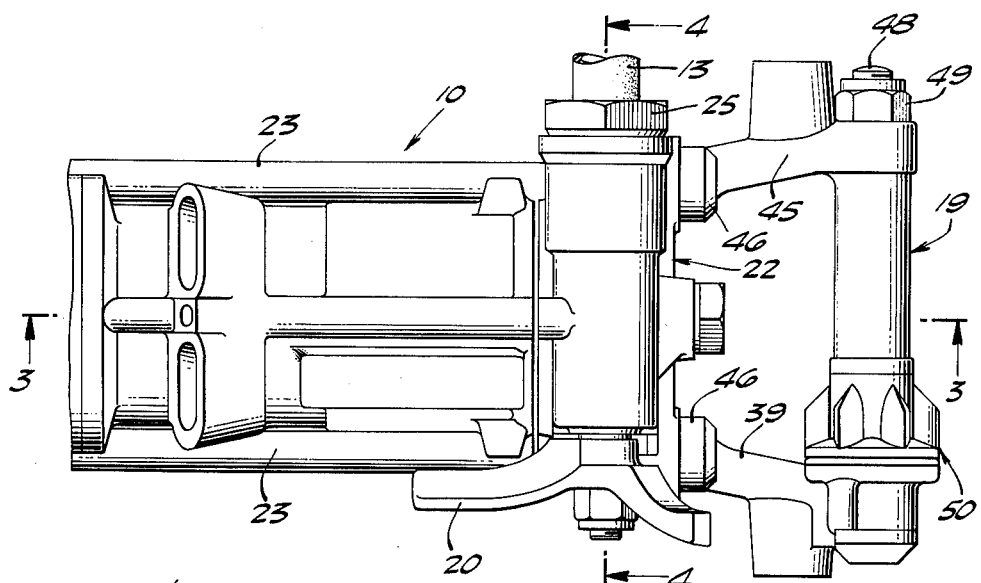
FIGURE 2 is an enlarged top plan view of the rear end of the drill.

Referring now to FIGURES 2 and 11, details of the handgrip and of the air flow passages therein will be described. As is best shown in FIGURE 11 handgrip 19 is supported at one end by a rigid leg 39 and at the other end by a rigid leg 45, the inner end of both legs being firmly secured to backhead 22 by cap screws 46. The outer end of leg 39 and handgrip portion 19 have different diameter aligned bores 47, 47 for snugly seating a hollow shouldered bolt 48 held against rotation by a noncircular head (FIGURE 11) and provided at the threaded end thereof with a shakeproof clamping nut 49. Rotatably seated about the larger diameter portion of bolt 48 is an outwardly fluted sleeve or control valve 50 provided on its interior with an arcuate recess or passage 51 effective to regulate flow between the closely spaced ends of a pair of passages 53 and 54 formed lengthwise of bolt 48 but opening radially outward through the side wall of the bolt opposite the interior side wall of control valve 50. The other end of passage 53 communicates with passage 41 of handgrip supporting leg 39 whereas the other end of passage 54 opens to the atmosphere through the threaded end of bolt 48.

The larger end of control valve 50 is provided with a shallow arcuate groove 55 into which projects the end of a stop pin 56 (FIGURE 5) frictionally retained in a bore of handgrip leg 39. Pin 56 limits the rotary movement of control handle 50 to an arc of 225 degrees between the two extreme positions shown in FIGURES 12 and 13, respectively. This wide range movement co-operates with arcuate recess 51 and with a pair of similar narrow grooves 58, 59 of decreasing depth formed in the exterior of bolt 48 to provide a very fine throttle control over the amount of air allowed to escape from passages 41 and 53 to the atmosphere through passage 54. Thus when control valve 50 is positioned as shown in FIGURES 12, 14 and 16 there is maximum communication between passages 53 and 54 whereas when it is in the alternate extreme position illustrated in FIGURES 13, 15 and 17 all communication between passages 53 and 54 is cut off and none of the pressurized air admitted to the feed can escape to the atmosphere via passages 53, 54. However, if the control knob is rotated through approximately 25 degrees counterclockwise from the position illustrated in FIGURES 13, 15 and 17, very restricted flow can take place axially of passage 51, across the very shallow adjacent ends of the similar grooves 58, 59. The significance of the further control of the air allowed to escape through passage 54 will be explained in detail presently, it being sufficient to point out at this time that valve 50 is easily rotated about the axis of the handgrip by the thumb of the operator to control escape of air and thereby the air pressure existing within the feed leg. Accordingly by proper adjustment of valve 50 the operator can vent to the atmosphere the amount of air necessary to maintain the feed leg in any desired extended position thereof.

Before leaving the description of FIGURE 11 it will be understood that bolt 48 and control valve 50 are provided with a series of sealing gaskets as O-rings to prevent leakage of air and interference with the precision action of valve 50 in controlling feed leg 11. One pair of O-rings 60, 60 surrounds the larger end of bolt 48 to either side of passage 41. A second pair 61, 61 are seated in annular recesses at either end of control valve 50 and another O-ring 63 cooperates with the adjacent one of O-rings 61 to prevent the escape of air across the left hand end of knob 50.

Referring now more particularly to FIGURES 5 to 10 there will be described the manner in which pressurized air flow to the feed leg is controlled, it being noted that the rear underside portion of the main body of drill 10 is provided with a cylindrical bore 64. This bore is closed at its forward end by a cap 65 held in assembled position by a pin 66. Slidably supported within valve chamber or bore 64 is a spool valve 67 spring pressed toward the right as viewed in FIGURE 5 by spring 68, the valve being free for limited to and from movement as determined by the width of the groove through which retainer pin 66 extends. Spool valve 67 includes three large diameter sections 70, 71, 72, each having a close sliding fit with bore 64, and operatively associated with certain ports opening through the wall of bore 64 for purposes now to be described.

Referring first to the right hand end of bore 64 and to FIGURES 5 and 9, it is pointed out that a pair of passages 73 open downwardly to the atmosphere with their upper ends opening into bore 64 when not closed by portion 72 of spool valve 67. In the normal operating position of valve 67 shown in FIGURE 5, passages 73 are only partially closed and the portion of bore 64 between valves 71 and 72 is vented to the atmosphere.

As is clear from FIGURES 5 and 8, pressurized air supply bore 40 communicates with valve bore 64 through a pair of passages 74. The lower ends of passages 74 are closed by plugs 75. The merger of passages 74 with bore 64 is positioned closely beside enlarged portion 71 of the valve with the result that movement of this valve to the left as viewed in FIGURE 5 closes passages 74 and prevents pressurized air from entering bore 64 unless and until valve portion 71 uncovers passages 74.

Referring to FIGURES 5 and 9, it will be noted that enlarged portion 70 of valve 67 normally overlies the merger of venting ports 77 with bore 64, the lower ends of vents 77 opening to the atmosphere and functioning as dumping ports through which pressurized air from the upper end of the feed leg is exhausted when valve 67 is moved to the left hand end of its stroke.

Spool valve 67 is actuated by a pair of plungers 79, 80 arranged in general alignment therewith. Plunger 79 is slidable lengthwise of a supporting bore 81 formed in backhead 22 wherein it is held captive by a retainer pin 82 extending across a notch 83 in its side. Plunger 79 is normally urged to the limit of its right hand movement by coil spring 84.

Actuating plunger 80 is freely slidable along bore 86 formed in the handgrip supporting leg 39 and is urged to the right as viewed in FIGURE 5 by spring 87 to the extent permitted by a retainer pin 88 extending crosswise of a notch 89 in the side of plunger 80. The right hand end of plunger 80 projects from the end of handgrip leg 39 closely beside one end of air control valve member 50, and is readily depressed by the operator's thumb whenever it is desirable to operate spool valve 67 to discontinue or modify the supply of pressurized air to the feed leg or to dump air present to the atmosphere.

The air passages leading to the feed leg are formed in an enlargement 91 integral with the underside of the main body of drill 10. These passages comprise a pair of passages 92, 93 (FIGURE 10) which open laterally into bore 64 to either side of the center enlarged portion 71 of spool valve 67. The outer ends of passages 92, 93 open through the interior side wall of an open ended bore 95 extending across the forward end of enlargement 91. Rotatably seated in bore 95 is a spindle 96 fixed at one end to a bracket arm 97 carried by the upper end of feed leg assembly 11. Spindle 96 is held rotatably seated in bore 95 by a stiff coil spring 98 with one end bearing against a frusto-conical bearing ring 99 and its outer end against a washer and nut 100 mounted over the threaded outer end of spindle 96.

Spindle 96 is provided in its mid-portion with a pair of axially spaced annular grooves 102, 103 mating respectively, with the ends of air flow passages 92 and 93. Formed lengthwise of the spindle are a pair of passages 104, 105 which open at one end into grooves 103 and 102, respectively, the other end of passage 104 opening into the upper end of the feed leg cylinder. The other end of passage 105 communicates with a pair of passages 106 extending lengthwise of the feed leg and opening into the lower end of the feed leg cylinder 107. This cylinder is provided at its lower end with a packing gland assembly 108 slidably supporting the tubular lower half 109 of feed leg 11. Threadedly secured to the bottom of tube 109 is a coupling 110 provided with the usual multiple-pronged foot structure 111 adapted to bite into the floor and form a solid footing for the feed leg in a wide range of operating positions of the latter. Fixed to the upper end of lower leg 109 is a suitable piston structure 113 having a close sliding fit with the interior side wall of cylinder 107. It will be understood that this piston is of any suitable construction and includes packing rings or the like preventing leakage of air between the opposite ends of cylinder 107.

*Operation of first described embodiment*

The operation of the described sinker drill will be quite apparent from the foregoing detailed description of its principal components and their structural and functional relationships to one another. Normally the drill will be set up as required for a given drilling operation, as for example in the general position indicated in FIGURE 1 with the tip of drill steel 12 bearing against the face of the formation 17 to be drilled. Usually when starting, feed leg 11 is collapsed or retracted sufficiently to provide for adequate extension to accommodate the depth of the bore hole to be drilled, piston 113 of the feed leg then being near the upper end of cylinder 107. At the start of the collaring operation the operator's right hand norally grasps handgrip 19 firmly leaving the left hand free to steady the drill rig and to operate the main control handle 20 for the air valve and for other similar duties.

As shown in FIGURE 1, air valve handle 20 is closed. In this position no air enters the main body of the drill to operate hammer 31 in accordance with conventional practice. However, passage 32 of the main valve plug 24 is then free to supply air to the arcuate groove 33 surrounding the body of the plug thereby admitting pressurized air to passage 34 and through which all air supplied to feed leg 11 must pass.

The manner in which the air flows to the upper end of feed leg cylinder 107 will be best understood by reference to FIGURE 20. From this view it will be apparent that the air entering passage 34 passes through openings 44 into open ended tube 36. Part of the air entering tube 36 can flow to the right into passage 41 of the handgrip for venting to the atmosphere provided control valve 50 is in any open position. Pressurized air entering tube 36 can also flow to the left as viewed in FIGURE 20 and through passage 40, 74, into spool valve chamber 64. If spool valve 67 is positioned as shown, the air flows into passage 93, annular groove 103 of spindle 96 and thence along passage 104 into the upper end of feed leg cylinder 107. The lower end of cylinder 107 is then in communication through passages 106, 105, spindle groove 102, and passage 92, the latter opening into the right hand end of valve chamber 64 which is vented to the atmosphere through venting passages 73. It will thus be seen that the lower end of cylinder 107 and the lower end face of piston 113 are subject to atmospheric pressure.

Under the conditions described it will be understood that the feed leg will remain in a desired extended position supporting the weight of the drill 10 if control valve 50 mounted on handgrip 19 is properly positioned to vent substantially as much air from the right hand end of tube 36 as enters this tube from supply passage 34. There may be minor air leakage losses and for this reason a certain amount of excess air may be required to maintain the cylinder pressure at a desired value. Under these operating conditions spool valve 67 remains stationary in the position shown in FIGURES 5, 10 and 20. If the operator wishes to extend the feed leg slightly to advance the drill or to maintain it at a desired operating height, he merely rotates valve 50 slightly in a direction to increase or to throttle the quantity of air permitted to vent to the atmosphere through passages 41, 53, and 51, 54. This modifies the air flow to the upper end of cylinder 107 providing the power necessary to extend or retract the feed leg cylinder relative to piston 113. In this manner the operation of the drill is continued solely under the guidance and control of the operator's right hand firmly encircling handgrip 19 with his right hand thumb pressed against control valve 50 and effective to rotate this valve with preciseness in either direction.

Let it be assumed that during the collaring operation the drill bit strikes a hard object or jams through engagement with a chunk of rock or for other reason, and is deflected to one side thereby giving rise to a possible emergency if the pressure on the drill steel is not quickly released. Double assurance to this end is provided by rotating air control valve 50 to its maximum open position illustrated in FIGURES 12, 14 and 16. Additionally, and and faster in the results obtained, is the instant depression of actuator plunger 80 by the operator's right thumb accomplished while the right hand remains firmly grasped about handgrip 19. Depression of plunger 80 shifts plunger 79 and, thereby, spool valve 67.

If plunger 80 is fully depressed, as it would be in an emergency, the left hand enlarged portion of the spool valve passes to the left beyond passageways 77 and permits the pressurized air trapped within the upper end of the feed leg cylinder to escape to the atmosphere through venting ports 77, the flow taking place along passage 104, groove 103, passage 93, bore 64 and dumping air passages 77. Aiding this rapid dumping action is the pressurized air supplied to the lower end of cylinder 107 by way of passageway 74, the right hand end of spool valve chamber 64, passage 92, groove 102 in spindle 96, and passages 105, 106. The pressurized air so supplied is effective to retract the feed leg forcibly. Under these conditions the large portion 72 of spool valve 67 closes venting ports 73 so that all pressurized air entering valve chamber 64 is directed into the lower end of the feed leg cylinder.

Normally, in any emergency situation the operator will wish to support the drill and the feed leg in a partially retracted position briefly and until an inspection discloses the difficulty and a decision has been reached as to whether it is safe to proceed with drilling. As soon as the feed leg and the drill have been retracted to a safe position the operator allows plunger 80 to move outwardly to an intermediate position under the influence of springs 68, 84, 87 and in which intermediate position enlarged portion 71 of the spool valve covers pressurized supply passage 74 thereby cutting off flow of pressurized air to the feed leg. Under these conditions both sets of venting ports 73 and 77 are also closed trapping the air in the feed leg cylinder and utilizing the pressure of the trapped air to hold the feed leg in a stable position without effort on the part of the operator.

In view of the foregoing it will be apparent that the disclosed construction and the several ways of controlling the supply of air to and from the feed leg while the operator retains a firm grip on handgrip 19 with his right hand while using his right thumb selectively to exercise precise control of venting valve 50 or quickly action control of dumping valve actuator 80. Meanwhile his left hand remains free to operate the main control valve 20 or to grasp other parts of the equipment to guide it or shift it as is deemed appropriate and expedient in the operation of the equipment. At no time is it necessary or desirable to remove the right hand from a firm position on handgrip 19 or out of manipulating position as respects valve 50 and plunger 80.

*Second embodiment*

Referring to FIGURES 21 to 24 there is illustrated an alternative feed leg assembly differing from FIGURE 18 in that the retractable leg shown in it is of the non-power retractable type. Also shown in these figures is an alternate dumping valve and a locking device for holding the valve locked in full dumping position. Since the construction of non-retractable legs are well known to those familiar with this art, no detailed illustration is necessary beyond the diagrammatic showing made in FIGURE 22. It is pointed out that the similar structural features in the second embodiment are indicated by the same reference characters distinguished by a prime. The non-retractable feed leg designated generally 11' shown in FIGURES 21, 22 includes a piston cylinder 107' slidably supporting a piston 113' on a piston rod 109'. It will be understood that feed leg 11' differs from the FIGURE 18 construction essentially in the omission of a pressurized air passage leading to the upper side of its actuating piston and corresponding to the passages for effecting the power retracting of the feed leg shown in FIGURE 18. In other words feed leg assembly 11' comprises simply a cylinder 107' having a piston 113' slidably supported therein and secured to the inner end of a tubular piston rod 109' and fitted at its lower end with a suitable footpiece 111'.

Bracket 97′ rigidly connected to the upper end of the cylinder 107′ has fixed thereto a spindle 96′ having a single air passage 104′ opening at one end into the upper end of cylinder 107′ and the other end into groove 103′. This groove is formed in spindle 96′ and opens into supply passage 93′ in enlargement 91′ lying along the underside of the sinker drill body. The pressurized air so supplied to the lower end of cylinder 107′ is effective against piston 113′ therein to extend the feed leg in accordance with the quantity and pressure of air admitted to the cylinder. The second air flow passage 92′ present in enlargement 91′ of the drill tool terminates against the side wall of spindle 96′ and accordingly is blocked and incapable of performing any function when non-retractable feed leg 11′ is assembled to drill tool 10.

It will be understood from the foregoing and by comparison of FIGURES 18, 21 and 22 that either the retractable feed leg 11 shown in FIGURE 18 or the non-retractable leg 11′ illustrated in FIGURES 21, 22 may be assembled within transverse bore 95 of the drill tool. Spindles 96 and 96′ of the two feed leg assemblies differ from one another only as respects the number of sets of grooves and connecting passages provided therein for the handling of air to and from the feed leg. Thus the power retractable type requires a pair of grooves 102 and 103 as well as a pair of passages 104 and 105 leading to the opposite ends of cylinder 107 and usable as described above to effect both the forcible extension and the forcible retraction of the feed leg. When using the non-retractable assembly 11′ shown in FIGURES 21, 22, however, only a single groove 103′ and a single flow passage 104′ are required. It will therefore be apparent and understood that the described sinker drill can be used alternatively with either leg 11 or 11′ and without need for making any other change in any part of the drill equipment other than the assembly of the selected feed leg within seating opening 95.

Referring now more particularly to FIGURES 22 to 24 showing the modified operator for valve 67′ controlled by the push-button 80′, it will be observed that this push-button is urged to its normal retracted position shown in full lines (FIGURE 24) by a compression spring 87′. The operative connection between the valve proper and its control button comprises a close wound coil spring 80″ brazed, bonded or otherwise securely assembled to the inner end of button 80′.

Under certain operating conditions it is important that button 80′ be held depressed without risk of unintended resumption of pressurized air supply to the feed leg. To assure this result the modified embodiment includes a locking or holding device for the push-button effective to hold valve 67′ depressed until the operator deliberately returns it to the normal position shown in FIGURE 22. In general, the locking device operates by pressing button 80′ inwardly so that a generally radial extension therefrom can be by-passed past a holding boss effective to hold the button depressed. After the button has been fully depressed it can be rotated through a small arc of 5 to 10 degrees past the holding boss and then released for partial return to its extended position but with the detent arm then locked against reverse rotation of this boss.

Referring to the drawings it will be observed that button 80′ is provided with a generally radially extending arm 125 having a thumb piece 126. Normally and with button 80′ fully extended to the right as shown in FIGURE 23, arm 125 is seated in a notch 127 formed in a keeper or guard member 128. Keeper 128 includes an integral mounting ring 129 which is held assembled to the leg 39′ of handgrip 19′ by bolt 48′. Ring 129 is non-circular on its periphery and it is thereby held firmly against rotation.

To latch button 80′ in depressed position, the operator presses his thumb against thumb piece 126 and presses it inwardly until arm 125 rests directly against surface 130 (FIGURE 24) whereupon the arm can be rotated clockwise through a small arc until it abuts flange 131 (FIGURE 23). If the finger piece 126 is then released, arm 125 will come to rest in notch 133 of keeper 128. A low-height boss 135 between notches 130 and 127 then prevents counter-rotation of the arm and it is held depressed in the dotted position indicated in FIGURES 23 and 24.

*Operation of second embodiment*

The operation of the second embodiment is generally similar to that described above in connection with the first embodiment and need not be repeated here except as respects those aspects differing from the first embodiment. Pressure regulating valve 50′ operates as described above to admit pressurized air along passage 34′ into the feed leg 11′ to extend it unless valve 50′ is so adjusted as to vent excess air to the atmosphere along venting passage 47′. The flow of pressurized air takes place through passage 34′, passage 40′, past spool valve 67′ into passage 93′, passage 104′ and through the passage along piston rod 109′ and into the lower end of cylinder 107′. The extension of the feed leg is controlled by rotating regulating valve 50′ to vent the proper portion of the pressurized air to the atmosphere in the manner explained in detail above. If it is desired to collapse feed leg 11′, the operator depresses button 80′ thereby shifting valve 67′ to the left as viewed in FIGURE 22. This cuts off the supply of pressurized air from passage 40′ and allows the air then present in the lower end of the feed leg to escape backwardly along passage 104′, 93′ and to the atmosphere through vent passage 77′. The operator safeguards against the possibility of restoring the flow of pressurized air to the feed leg unintentionally by pressing button 80′ fully inwardly until its detent arm 125 can be rotated slightly clockwise to lie behind locking boss or detent 135 with arm 125 seated in notch 133. So long as seated in the latter notch there is no possibility of pressurized air being fed to the feed leg and this is equally true irrespective of which one of the two feed leg designs is assembled to the drilling unit.

When it is again desired to extend the feed leg the operator need but depress button 80′ inwardly until arm 125 engages surface 130 and then rotate the button counterclockwise through a short arc until the arm is aligned with the notch 127. Spring 87′ then returns the button and arm 125 to its normal retracted position as spring 68′ returns dumping valve 67′ to the position shown in FIGURE 22 to supply pressurized air to the feed leg.

From the foregoing it will be appreciated that extension of non-power retracted feed leg 11′, as well as the mode of holding the same steadily in any extended position is controlled in the same manner described above in connection with the first preferred embodiment, use being made of pressure regulating control valve 50. Retraction of the leg can be accomplished either by venting excess air to the atmosphere by way of pressure regulating valve 50, or more quickly and positively by depressing dumping valve button 80′ so as to discontinue all air supply to the feed leg while venting that already present to the atmosphere through vent 77′.

While the particular sinker drill herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. In a pneumatic sinker drill unit of the type having a pressure actuated supporting feed leg pivotally connected thereto and having its axis disposed at an acute angle to the axis of said drill unit, said feed leg being operable to advance the drill unit into the formation as drilling proceeds using manually-controlled quantities of pressurized air diverted from the main supply thereof to operate the drill unit; that improvement which comprises means for bleeding feed leg operating air from said main supply and conveying one portion of the same into said feed leg to actuate the leg to support and to advance the drill unit, handgrip means normally grasped by one hand of the operator for guiding and manipulating said drill unit, control means mounted on said drill unit adjacent said handgrip means and actuatable by the operator's said one hand while grasping said handgrip means to control the venting of another portion of said feed leg operating air to the atmosphere thereby to control the operating pressure in said feed leg and the extension and retraction thereof as desired by the operator, said means controlling venting of pressurized air from said feed leg comprising a valve actuating member rotatable about the axis of said handgrip means and being readily and accurately adjustable by the thumb and forefinger of the same hand used by the drill operator to guide the advance of the drill unit thereby leaving the operator's other hand free to perform other tasks, and fast-action air dumping means operable to cut off the supply of pressurized air to said feed leg and simultaneously exhaust to the atmosphere pressurized air within said feed leg to discontinue advance of the drill should an emergency threaten drilling operations.

2. A pneumatic sinker drill as defined in claim 1 characterized in that said dumping means includes an operating means positioned closely beside said venting control means whereby the operating means for said dumping means and said venting control means are operable selectively by the same hand of the operator normally used to grasp said handgrip means.

3. In combination a pneumatically actuated drill, an extendable feed leg pivotally connected with said drill with its axis normally disposed at an acute angle to the axis of the drill unit and cooperable therewithin to support a major portion of the drill as the latter advances while drilling, an operator guide handle secured to said drill and by which the operator guides said drill, said handle including means manipulatable by the operator's hand while grasping said guide handle to control the flow of pressurized air admitted to said feed leg, said last named means including means positioned closely adjacent the control means for said feed leg for instantly releasing pressurized air from said leg to discontinue the advance of said drill upon the occurrence of a threat to safe operating conditions, said last named means being operable by the operator's hand while that hand is grasping said guide handle and by the same finger used to operate said means for controlling the flow of air to said feed leg, said manipulatable means for controlling the supply of pressurized air to said feed leg and the said means for releasing air therefrom being quickly reversible to resume normal feed leg and drilling operation by the same hand employed to guide the advance of said sinker drill, and said means for releasing air from said feed leg including means operable concurrently therewith for discontinuing the supply of pressurized air to said feed leg so long as said releasing means is open.

4. The combination defined in claim 3 characterized in that the means for supplying pressurized air to said feed leg and the means for releasing air therefrom include separate ports for venting air to the atmosphere, and in that said pressurized air supply means includes means for normally venting air to the atmosphere in varying quantities under the manual control of the operator and at rates found necessary to control the advance and support of the drill under varying operating conditions.

5. The combination defined in claim 3 characterized in that said means for releasing air from said feed leg includes a reciprocable spool valve and porting passages cooperable in one position of said valve to supply pressurized air to said feed leg and in an alternative position thereof cut off the supply of additional pressurized air and to release pressurized air then present in the feed leg to the atmosphere.

6. A pneumatically actuated sinker drill having a main body, an extendible feed leg pivotally connected with said main body with its axis normally disposed at an acute angle to the axis of said sinker drill and including air passage means for supplying pressurized air thereto and for releasing such air therefrom, a backhead assembly secured to the rear end of said main body including a rigid handgrip and a master air control valve adjacent thereto, said master valve having means for cutting on and off the flow of pressurized air to said feed leg air passage means, control valve means mounted on said handgrip for regulating the venting of pressurized air enroute to said feed leg and effective to control the extension of said leg in accordance with operating needs, and fast action air dumping means having an actuating control at said handgrip and operable to discontinue air flow to said leg abruptly independently of the position of said control valve means.

7. A sinker drill as defined in claim 6 characterized in that said feed leg includes a cylinder having a piston and a rod assembly slidable therein, said air passage means for said feed leg including separate flow passages communicating with the opposite ends of said piston with one flow passage being connectible with said pressurized air supply passage means and the other flow passage being vented to the atmosphere, said fast action air dumping means including means for closing off said last mentioned vent and thereafter supplying pressurized air through said venting passage and to said feed leg to forcibly retract said feed leg as pressurized air is dumped from the other side of said piston to the atmosphere.

8. A sinker type pneumatic drill adapted to be supported by a pneumatically powered feed leg assembly, said drill having a main body, a backhead unit secured to one end of said body, means on said drill for receiving pressurized air from a single source of supply, a handgrip fixed to said backhead unit, valve means rotatably supported adjacent and offset toward one end of said handgrip including means thereon engageable by the thumb or index finger of the operator's hand while grasping said handgrip, means cooperating with and controlled by said valve means for regulating the pressure and the flow of pressurized air to a supporting feed leg assembly independently of the pressure of the air supplied to said pneumatic drill when such assembly is connected to said pneumatic drill, and including means responsive to the position of said valve means to effect the extension as well as the controlled contraction of said feed leg, said rotatable valve being concentric with said handgrip and including an inwardly opening recess formed in its interior cylindrical side wall, said handgrip having a pair of passages extending therealong in end-to-end relation with their adjacent ends opening into said recess when said valve is rotated to bring said recess into bridging registry with the adjacent ends of said passages, and a pair of arcuate grooves of gradually decreasing cross-sectional area leading circumferentially from the adjacent ends of said passages and cooperable with the recess in said valve to vary the flow of air in accordance with the rotary position of said valve relative to said handgrip.

9. A sinker drill adapted to be supported on an extendable feed leg, said drill having a backhead assembly, means for supplying pressurized air to operate said drill, means for bleeding a portion of said pressurized air and dividing the same for flow through a first passage formed in said drill and adapted to be connected to a feed leg and for flow through a second passage formed in a tubular handgrip and opening to the atmosphere, control means for regulating the portion of air allowed to escape to the atmosphere, said control means including a member journalled about said handgrip and readily rotatable by the operator's hand while grasping said handgrip to vary the proportion of bleed air permitted to escape to the atmosphere from said tubular hand grip, said first passage adapted to be connected with a feed leg including first and second branches, and second control valve means having an operating end closely adjacent said handgrip and effective to divert the flow of air flowing in said first mentioned passage selectively to said first and said second branches.

10. A sinker drill as defined in claim 9 characterized in the provision of locking means adjacent said handgrip for locking said second control valve means in one operating position thereof until manually released.

11. A sinker drill as defined in claim 9 characterized in the provision of a barrier partition across said second passage and serving to separate a pair of ports opening laterally from said second passage, said member journaled about said tubular handgrip opposite said pair of ports comprising a ring having an arcuate chamber formed in the interior thereof opposite the outer ends of said ports, said arcuate chamber varying in size circumferentially of said ring and being effective as it is rotated relative to said handgrip to throttle the flow between the outer ends of said ports without substantially restricting the cross-sectional area of the outer ends of said ports thereby to provide a fine and precise adjustment of the air flow through said ports to the atmosphere.

12. A sinker drill as defined in claim 11 characterized in that said second passage is formed by a tube extending longitudinally of said handgrip and having a noncircular end seating against a complementally shaped portion on the adjacent end of said handgrip and cooperating to hold said tube against rotation in said handgrip, and means holding said tube assembled to said handgrip.

13. A sinker drill as defined in claim 9 characterized in that said second control valve means includes means normally holding the same in position to convey pressurized air through said first branch and into the upper end of a feed leg assembly and normally connecting said second branch to an atmospheric vent port, and said second control valve means being movable to an alternate position wherein said vent port is closed and pressurized air is supplied to said second branch for flow to the lower end of a feed leg assembly and wherein said first branch is connected to an atmospheric vent port.

14. A sinker drill as defined in claim 13 characterized in the provision of manually operable lock means for locking said second control valve means in one of its two alternate positions.

15. A sinker drill as defined in claim 14 characterized in that said manually operable lock means is located on said handgrip in position to be manipulated by the operator while maintaining his grasp of said handgrip thereby to lock said second control valve means in a position to supply pressurized air to the lower end of said feed leg assembly.

References Cited by the Examiner
UNITED STATES PATENTS

| 3,011,569 | 12/61 | Dick | 173—158 |
| 3,064,741 | 11/62 | Morrison | 173—36 X |
| 3,085,638 | 4/63 | Larcen | 173—36 |
| 3,111,177 | 11/63 | Osgood | 173—36 |

FOREIGN PATENTS

| 962,563 | 4/57 | Germany. |

BROUGHTON G. DURHAM, *Primary Examiner.*

MILTON KAUFMAN, *Examiner.*